United States Patent
Shih et al.

(10) Patent No.: US 12,458,965 B2
(45) Date of Patent: Nov. 4, 2025

(54) CENTRIFUGAL-DRIVEN MICROFLUIDIC PLATFORM AND METHOD OF USE THEREOF

(71) Applicant: FENG CHIA UNIVERSITY, Taichung (TW)

(72) Inventors: Chih-Hsin Shih, Taichung (TW); Yi-Ching Chiang, Taichung (TW); Chao-Hui Ke, Taichung (TW); Chih-Ting Liao, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 745 days.

(21) Appl. No.: 17/342,539

(22) Filed: Jun. 8, 2021

(65) Prior Publication Data

US 2021/0387179 A1    Dec. 16, 2021

(30) Foreign Application Priority Data

Jun. 16, 2020    (TW) ................................. 109120174

(51) Int. Cl.
| | |
|---|---|
| *B01L 3/00* | (2006.01) |
| *G01N 30/46* | (2006.01) |
| *G01N 30/56* | (2006.01) |
| *G01N 30/60* | (2006.01) |
| *G01N 30/88* | (2006.01) |

(52) U.S. Cl.
CPC ....... *B01L 3/5021* (2013.01); *B01L 3/502715* (2013.01); *G01N 30/46* (2013.01); *G01N 30/56* (2013.01); *G01N 30/6004* (2013.01); *G01N 30/606* (2013.01); *G01N 30/6091* (2013.01); *B01L 2400/0409* (2013.01); *G01N 2030/8881* (2013.01)

(58) Field of Classification Search
CPC .................................. C12Q 1/02; C12M 1/00
See application file for complete search history.

(56) References Cited

U.S. PATENT DOCUMENTS

| | | | |
|---|---|---|---|
| 8,343,778 B2 * | 1/2013 | Yu .......................... | B82Y 30/00 436/805 |
| 8,524,174 B2 * | 9/2013 | Yobas ..................... | F04B 43/14 137/833 |
| 9,914,120 B2 * | 3/2018 | De Oliveira Garcia Da Fonseca ............ | B01L 3/502753 |

(Continued)

FOREIGN PATENT DOCUMENTS

CN    106179549 A  * 12/2016    .......... B01F 13/0061

*Primary Examiner* — Maris R Kessel
*Assistant Examiner* — Mickey Huang
(74) *Attorney, Agent, or Firm* — Cheng-Ju Chiang

(57) ABSTRACT

In this invention, chromatography is integrated on a centrifugal platform to enable low-cost automated purification. Differing from the traditional chromatography method, purification and separation of a centrifugal compound collecting platform disclosed in the present invention mainly uses a centrifugal force to drive the fluid to flow outward in the radial direction when the motor rotates. The compounds to be separated react with the column packing during the flow, and the compounds with different polarities in the sample are gradually separated. The flow of the fluid can be governed by the motor and the geometry of the fluidic design such that compounds with different characteristics can be separated and collected in different collecting chambers.

19 Claims, 18 Drawing Sheets

(56) References Cited

U.S. PATENT DOCUMENTS

| | | | |
|---|---|---|---|
| 10,596,571 B2* | 3/2020 | Wo | B01L 3/567 |
| 2007/0102362 A1 | 5/2007 | Iida et al. | |
| 2009/0104643 A1 | 4/2009 | Bartholomeusz | |
| 2014/0242721 A1* | 8/2014 | Kellogg | G01N 33/543 |
| | | | 422/69 |
| 2019/0366341 A1* | 12/2019 | Cho | B01L 3/50273 |
| 2021/0331182 A1* | 10/2021 | Suarez | B04B 11/02 |

* cited by examiner (a1) Injecting particles into the injection chamber module and packing the separation column with the particles by the driving module

(a2) Injecting sample into the injection chamber module and pumping the sample into the separation column by the centrifugal force driven by the driving module

(a3) Injecting eluent into the injection chamber module and pumping the eluent into the separation column by the centrifugal force driven by the driving module

(a4) Performing a purification and separation progress, wherein the driving module controls the rotational speed to pump the sample and the eluent flowing through the connection channel module, entering the dispensing channel, and filling the plurality of collection chambers in turn

(a5) Analyzing the sample distributed among the plurality of collection chambers by using detection module to acquire a test result

Fig. 14

(b1) Inject particles into the injection chamber module and then pack the separation column with the particles by the driving module

(first automatic step)

(b2) Injecting sample and at least one eluent into the transient pause chamber and the at least one second eluent chamber respectively, and pumping the sample into the separation column by the centrifugal force driven by the driving module, and simultaneously the at least one eluent is trapped via the first valve, staying in the at least one second eluent chamber (b3) Increasing the rotational speed by the driving module so that the at least one eluent overcomes the first valve and enters the at least one decanting chamber, and the rotational speed is rapidly lowered so that the at least one eluent enters the transient pause chamber from the at least one decanting chamber; increasing the rotational speed to make the eluent enter the separation column again

(b4) Performing a purification and separation progress, wherein the driving module control the rotational speed to pump the sample and the eluent flowing through the connection channel module, entering the dispensing channel, and then filling the plurality of collection chambers in turn

(b5) Analyzing the sample distributed among the plurality of collection chambers by using the detection module to acquire a test result

Fig. 15

(c1) Injecting particles into the injection chamber module and packing the separation column with the particles by the driving module (second automatic step)

(c2) Injecting sample, the first eluent and the second eluent into the transient pause chamber, the first decanting chamber and the second decanting chamber respectively, and pumping the sample into the separation column by the driving module, and rapidly decrease the rotational speed so that the first eluent enters the first transient pause chamber and the second eluent enters the second transient pause chamber (c3) Increasing the rotational speed by the driving module so that the first eluent overcomes the second valve to enter the transient pause chamber and the second eluent overcomes the third valve to enter the first decanting chamber (c4) Reducing the rotational speed or change the direction of rotation by the driving module so that the first eluent enters the separation column and the second eluent enters the first transient pause chamber (c5) Increasing the rotational speed by the driving module to make the second eluent overcome the second valve and enter the transient pause chamber, and then enter the separation column (c6) Performing a purification and separation progress, wherein the driving module controls the rotational speed to pump the sample, the first eluent and the second eluent flowing through the connection channel module, entering the dispensing channel, and then filling the plurality of collection chambers in turn (c7) Analyzing the sample distributed among the plurality of collection chambers by using the detection module to acquire a test result

Fig. 16

CENTRIFUGAL-DRIVEN MICROFLUIDIC PLATFORM AND METHOD OF USE THEREOF

TECHNICAL FIELD

The invention provides a centrifugal-driven microfluidic platform, which mainly uses a centrifugal force to drive the fluid to flow to the outer radius when the motor rotates and can be used to purify and extract samples of organic compounds and biological samples.

BACKGROUND OF RELATED ARTS

In recent years, microfluidic technology develops in a rapid way. It is a kind of miniaturized analytical platform which integrates the sample preparation and detection processes, including mixture of liquid, separation, drug reaction . . . etc. on the same device. The advantages are that it only required mini size of volume (microliter) and that the device don't cost a lot. The miniature devices are widely used in lysis of cells, DNA detection, and human medical detection. If the microfluidics technology applies to the biochemical detection system, it has a high potential for commercialization.

Chromatography has so far been the most common method separating the mixture by the affinity of stationary phase and the mobile phase in the organic chemistry lab. The existed chromatography technology has fully developed, and it is also used in many fields of science. The column chromatography is used in the organic chemistry lab for the separation and purification in the organic compounds synthesis. The column chromatography is used in the biochemistry lab for the separation of the required product of protein. As a result of the large volume (at least one milliliter) required for the existed chromatography and the tedious experimental process, there has been increasing researchers commence to study how to combine the chromatography with the microfluidic technology. Despite current research interest, the samples are required to prepared in such a way that facilitate the working of miniaturized analytical platforms, which is an opening for technological breakthrough.

SUMMARY

The present invention combines a microfluidic centrifugal platform with the purification of organic compounds to achieve the purposes of making the experimental platform smaller, performing the automatic inspection instead of manual operation, reducing amounts of reagent, high manipulability, and reducing time. It is expected that the field of microfluidic centrifugal platforms has been developing.

In view of the deficiencies of the prior arts, the present invention provides a centrifugal-driven microfluidic platform, which mainly comprises: a microfluidic module, and the microfluidic module comprises a microfluidic disk and a microfluidic structure. The microfluidic structure further comprises: at least one injection chamber module, disposed on the microfluidic disk; at least one separation column, disposed on the microfluidic disk and connected with the injection chamber module; at least one dispensing channel, disposed on the microfluidic disk and connected with the separation column by a connection channel module; a plurality of collection chambers, disposed on the microfluidic disk; each of the collection chamber connects with the dispensing channel respectively; a waste chamber, disposed at the end of the dispensing channel. The at least one separation column is a spiral structure, and the at least one dispensing channel is a spiral or arc structure.

Additionally, the centrifugal-driven microfluidic platform further comprises: a driving module, a microfluidic module is disposed on the driving module. An operation module, the operation module drives the driving module. A detection module, the detection module connects with the microfluidic module and the driving module respectively, and a test result is acquired from the detection module.

Furthermore, the present invention provides a method of using the centrifugal-driven microfluidic platform as the abovementioned, the steps comprise: (a1) Inject particles into the injection chamber module and then pack the separation column with the particles by the driving module; (a2) Inject sample into the injection chamber module and then pump the sample into the separation column by the centrifugal force driven by the driving module; (a3) Inject eluent into the injection chamber module and then pump the eluent into the separation column by the centrifugal force driven by the driving module; (a4) Perform a purification and separation progress, and the driving module controls the rotational speed to pump the sample and the eluent flowing through the connection channel module, entering the dispensing channel, and then filling the plurality of collection chambers in turn; and (a5) Analyze the sample distributed among the plurality of collection chambers by using detection module to acquire a test result.

The present invention further provides the other method of using the centrifugal-driven microfluidic platform, the at least one injection chamber module further comprises at least one transient pause chamber, at least one decanting chamber and at least one second eluent chamber, and the at least one decanting chamber connects with the at least one second eluent chamber by a first valve. The method comprises the steps following: (b1) Inject particles into the injection chamber module and then pack the separation column with the particles by the driving module; (b2) Inject sample and at least one eluent into the transient pause chamber and the at least one second eluent chamber respectively, and then pump the sample into the separation column by the centrifugal force driven by the driving module, and simultaneously the at least one eluent is trapped by the first valve, staying in the at least one second eluent chamber; (b3) Increase the rotational speed by the driving module so that the at least one eluent overcomes the first valve and enters the at least one decanting chamber; then, the rotational speed is rapidly lowered so that the at least one eluent enters the transient pause chamber from the at least one decanting chamber; finally, increase the rotational speed to make the eluent enter the separation column again; (b4) Perform a purification and separation progress, and the driving module controls the rotational speed to pump the sample and the eluent flowing through the connection channel module, entering the dispensing channel, and then filling the plurality of collection chambers in turn; and (b5) Analyze the sample distributed among the plurality of collection chambers by using the detection module to acquire a test result.

The present invention further provides the other method of using the centrifugal-driven microfluidic platform. In the present embodiment, there are two kinds of eluents, and the method comprises the steps following: (c1) Inject particles into the injection chamber module and then pack the separation column with the particles by the driving module; (c2) Inject sample, the first eluent and the second eluent into the transient pause chamber, the first decanting chamber and the second decanting chamber respectively, and then pump the sample into the separation column by the driving module, and rapidly decrease the rotational speed so that the first eluent enters the first transient pause chamber and the second eluent enters the second transient pause chamber; (c3) Increase the rotational speed by the driving module so that the first eluent overcomes the third valve to enter the transient pause chamber and the second eluent overcomes the second valve to enter the first decanting chamber; (c4) Reduce the rotational speed or change the direction of rotation by the driving module so that the first eluent enters the separation column and the second eluent enters the first transient pause chamber; (c5) Increase the rotational speed by the driving module to make the second eluent overcome the second valve and enter the transient pause chamber, and then enter the separation column; (c6) Perform a purification and separation progress, and the driving module controls the rotational speed to pump the sample, the first eluent and the second eluent flowing through the connection channel module, entering the dispensing channel, and then filling the plurality of collection chambers in turn; and (c7) Analyze the sample distributed among the plurality of collection chambers by using the detection module to acquire a test result.

The present invention further provides the other method of using the centrifugal-driven microfluidic platform. In this embodiment, the connection channel module is a second connection channel (the second connection channel is a two-branched channel), and the method comprises the steps following: (d1) Inject particles into the injection chamber module and then pack the separation column with the particles by the driving module; (d2) Inject sample into the injection chamber module and then pump the sample into the separation column by the centrifugal force driven by the driving module; (d3) Inject eluent into the injection chamber module and then pump the eluent into the separation column by the centrifugal force driven by the driving module; (d4) Perform a purification and separation progress in the separation column, and the driving module controls the rotational speed to pump the sample, the eluent or a combination thereof flowing through the second connection channel; and the driving module controls the direction of rotation to make the sample, the eluent or a combination thereof divert to the first flow path and then fill the plurality of collection chambers in turn; (d5) The driving module increases the rotational speed and rotate in an opposite direction to cause the remaining sample, the eluent or a combination thereof to flow through the second flow path and fill into the waste chamber; and (d6) Analyze the sample distributed among the plurality of collection chambers by using detection module to acquire a test result.

The present invention further provides the other method of using the centrifugal-driven microfluidic platform, an extraction chamber is disposed on each of the plurality of collection chambers, and the extraction chamber connects with each of the plurality of collection chambers by a fourth valve. The method comprises the steps following: (e1) Inject particles into the injection chamber module and then pack the separation column with the particles by the driving module; (e2) Inject sample into the injection chamber module and then pump the sample into the separation column by the centrifugal force driven by the driving module; (e3) Inject eluent into the injection chamber module and then pump the eluent into the separation column by the centrifugal force driven by the driving module; (e4) Perform a purification and separation progress, the driving module control the rotational speed to pump the sample, the eluent or a combination thereof flowing through the connection channel module, entering the dispensing channel, and then filling the plurality of collection chambers in turn; and (e5) The driving module increases the rotational speed and rotate in an opposite direction to cause the sample, the eluent or a combination thereof in the plurality of collection chambers flow through the fourth valve to enter the extraction chamber that leads to discontinuous flow; (e6) Analyze the sample distributed among the plurality of collection chambers by using detection module to acquire a test result.

Embodiments of the invention are illustrated by way of example, and not by way of limitation, in the figures of the accompanying drawings in which like reference numerals refer to similar elements.

BRIEF DESCRIPTION OF THE DRAWINGS

FIG. 14 demonstrates a flow chart showing the steps of using the centrifugal-driven microfluidic platform of the preferred embodiment of the present invention.

FIG. 15 demonstrates a flow chart showing the steps including first automatic step of using the centrifugal-driven microfluidic platform of another preferred embodiment of the present invention.

FIG. 16 demonstrates a flow chart showing the steps including second automatic step of using the centrifugal-driven microfluidic platform of another preferred embodiment of the present invention.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

Figure 2:
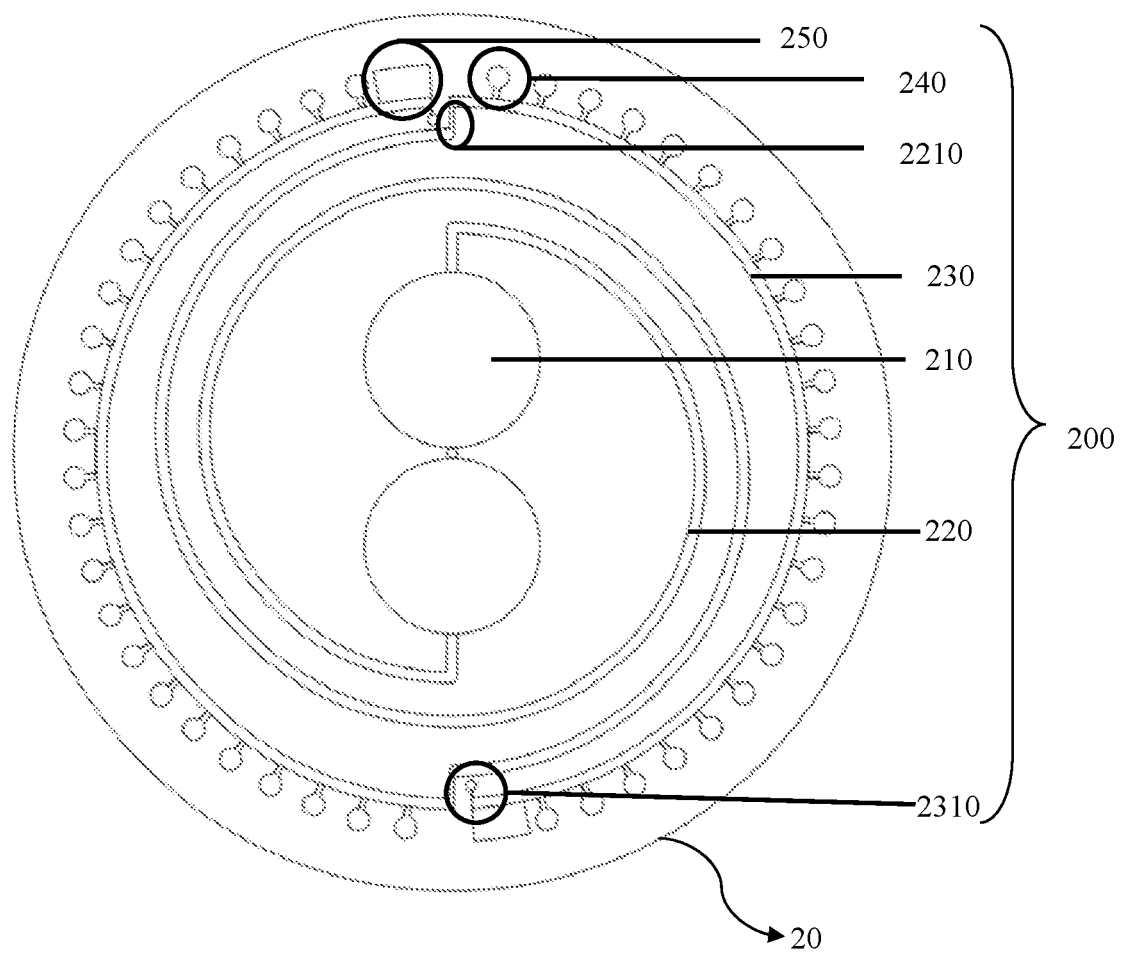
FIG. 2 illustrates a schematic diagram of the microfluidic module of the preferred embodiment of the present invention.

The present invention provides a centrifugal-driven microfluidic platform 1, please refer to FIG. 2; FIG. 2 is a schematic diagram of the microfluidic module of the preferred embodiment of the present invention. The embodiment of FIG. 2 provides a microfluidic module 2 of the centrifugal-driven microfluidic platform 1. In the present embodiment, the microfluidic module 2 comprises a microfluidic disk 20 and a microfluidic structure 200, the microfluidic structure 200 further comprises at least one injection chamber module 210, at least one separation column 220, at least one dispensing channel 230, a plurality of collection chambers 240, a waste chamber 250 and at least one connection channel module, and at least one vent 2310 is disposed on the at least one dispensing channel 230.

Furthermore, the at least one injection chamber module 210 is disposed on the microfluidic disk 20. The at least one injection chamber module 210 is disposed near the center of the gravity of the microfluidic disk 20. In one of the embodiments, each of the injection chamber modules 210 further comprises a transient pause chamber 2110, a decanting chamber 2120, a second eluent chamber 2130 or a combination thereof. The second eluent chamber 2130 connects with the decanting chamber 2120 by a first valve 2150a. At least one separation column 220 is also set on the microfluidic disk 20 and connected to the injection chamber module 210. Then, at least one dispensing channel 230 is also installed on the microfluidic disk 20 and connected to each separation column 220. Wherein, a waste chamber 250 is disposed at the end of each at least one dispensing channel 230, and at least one vent 2310 is further disposed on the dispensing channel 230. And at least one connection channel module connects at least one separation column 220 and at least one dispensing channel 230. Amongst the connection channel in different embodiments, the connection channel module may be in the form of a first connection channel 2210 (please refer to FIG. 2) or a second connection channel 2220 (please refer to FIG. 10). Among them, the first connection channel 2210 is a single-branched channel; the second connection channel 2220 is a two-branched channel. Finally, a plurality of collection chambers 240 are also installed on the microfluidic disk 20 and each is connected to the dispensing channel 230. In some embodiments, an extraction chamber 235 is further provided on the plurality of collection chambers 240, and the extraction chamber 235 is connected to each of the plurality of collection chambers 240 through a fourth valve 237. In this embodiment, the separation column 220 is a spiral structure, and the dispensing channel 230 is a spiral or arc structure.

Figure 1:
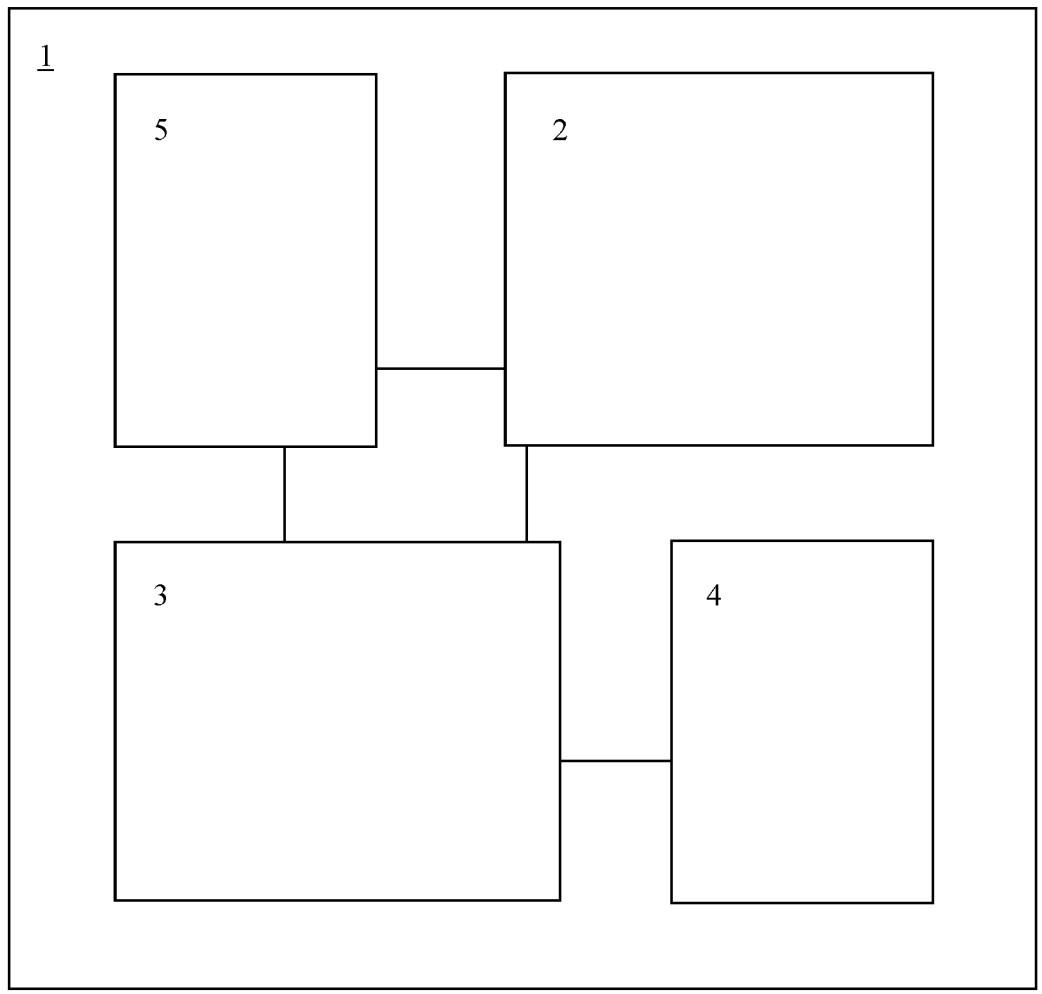
FIG. 1 illustrates a schematic diagram of the centrifugal-driven microfluidic platform of a preferred embodiment of the present invention.

Please refer to FIG. 1, which is a schematic diagram of a centrifugal-driven microfluidic platform 1 according to a preferred embodiment of the present invention. In the embodiment of FIG. 1, a complete architecture of centrifugal-driven microfluidic platform 1 is provided. In addition to the microfluidic module 2 described in FIG. 1, the centrifugal-driven microfluidic platform 1 shown in FIG. 1 includes driving module 3, operation module 4 and detection module 5.

Specifically, the driving module 3 is respectively connected to the microfluidic module 2 and the detection module 5, and the operation module 4 is used to drive the driving module 3. Detection module 5 is connected to microfluidic module 2 and driving module 3 respectively. Additionally, the final detection result of microfluidic module 2 is obtained by the detection module 5. In this embodiment, when using the centrifugal-driven microfluidic platform 1 in FIG. 1, the separation column 220 is first filled with particles by the driving module 3. Then, the sample to be tested is loaded into the injection chamber module 210 after the filling of the particles. Finally, the eluent is injected into the injection chamber module 210 after the sample is loaded.

Figure 13:
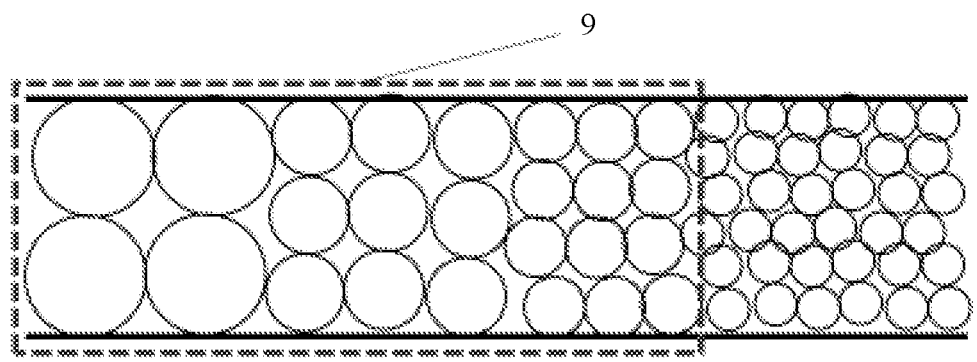
FIG. 13 shows a schematic diagram of the particle plug of a preferred embodiment of the present invention.

In this embodiment, the driving module 3 is a motor. Furthermore, the motor can be a programmable logic control motor such as a servo motor. And the motor is driven by the operation module 4. In one of the preferred embodiments of the present invention, the operation module 4 is a computer. Additionally, because it is only required a single motor to complete all detection operations, the overall cost of the entire centrifugal-driven microfluidic platform 1 is not high. In this embodiment, the particles are silica gel. Fill the injection chamber module 210 with a fixed volume of silica gel, and then fill the separation column 220 with the silica gel driven by the driving module 3. Furthermore, in order to prevent the filled silica gel from falling out of the separation column 220, a blocking module 9 is further provided at the end of the separation column 220. The blocking module 9 may be a cotton plug or a particle plug. In the case that using a particle plug, please refer to FIG. 13. As shown in FIG. 13, the particle plug of this embodiment is mainly composed of particles with different particle sizes, and the large to small particles are sequentially filled into the tail end of the separation column 220. The sample is a mixture of one or more organic compounds, and the desired product is purified and separated by using the centrifugal-driven microfluidic platform 1 of this embodiment.

Based on the structure of this embodiment and the specific microfluidic module 2, when using the centrifugal-driven microfluidic platform 1 of this embodiment for testing, the required sample volume may be less than 50 microliters ($\mu$L). Considering the existing chromatography technology, it usually requires a larger sample volume (at least 1 ml). Therefore, the sample size requirement in this embodiment can be greatly reduced in comparison to the prior art; the experiment time can also be reduced, and the tedious operation is prevented.

Figure 3:
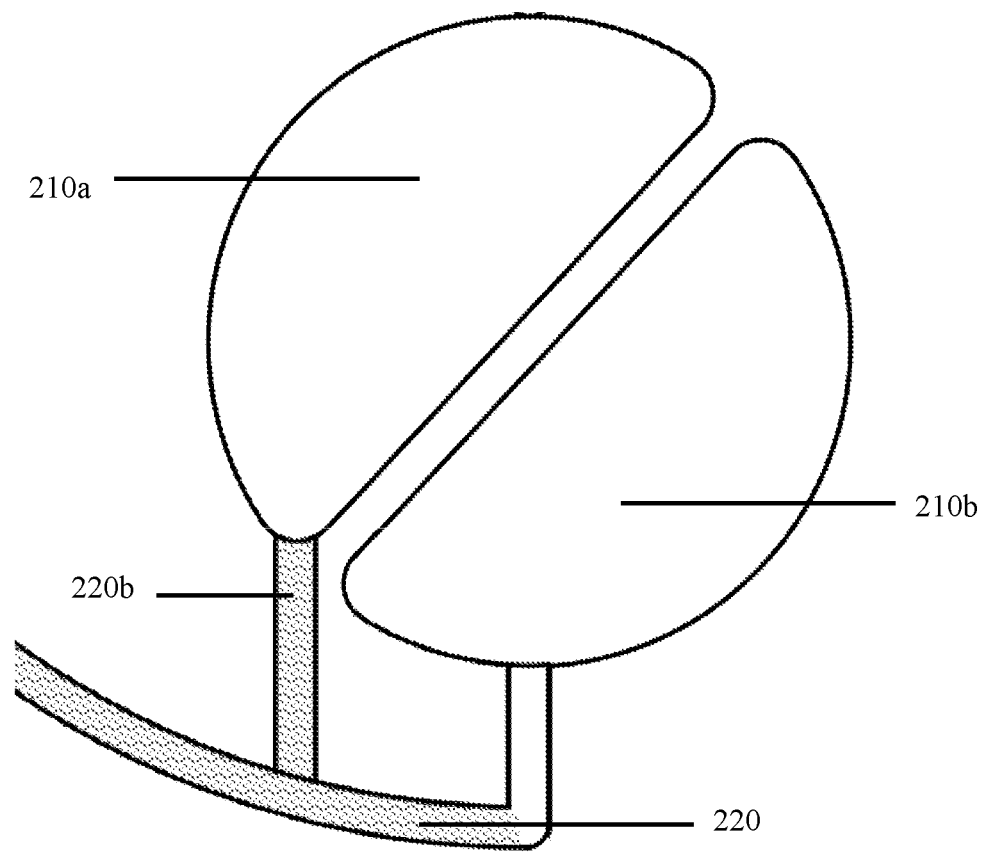
FIG. 3 illustrates a schematic diagram of the injection chamber module of the preferred embodiment of the present invention.

Please refer to FIG. 3, the present invention further provides another preferred embodiment of the centrifugal-driven microfluidic platform 1, and the injection chamber module 210 further includes a sample chamber 210a and a first eluent chamber 210b, which are respectively connected to the separation column 220. In this embodiment, since the purity of the eluent itself will affect the chromatographic separation effect during the chromatographic separation process, the injection chamber module 210 is divided into two tanks, which comprising the sample chamber 210a and the first eluent chamber 210b. The sample chamber 210a and the first eluent chamber 210b are configured to improve the clearness of the eluent and avoid the sample and the eluent to be mixed with each other before entering the separation column 220. Furthermore, the sample chamber 210a is connected to the separation column 220 through the second separation column 220b, and the second separation column 220b is filled with particles as shown in FIG. 3. In this way, the sample is first injected from the sample chamber 210a and the second separation column 220b is blocked by the particles. As a result, it is avoided that the eluent which is injected from the first eluent chamber 210b causes the principle of the communicating vessels and thus further enters the sample chamber 210a that leads to the contamination of the eluent.

Figure 4:
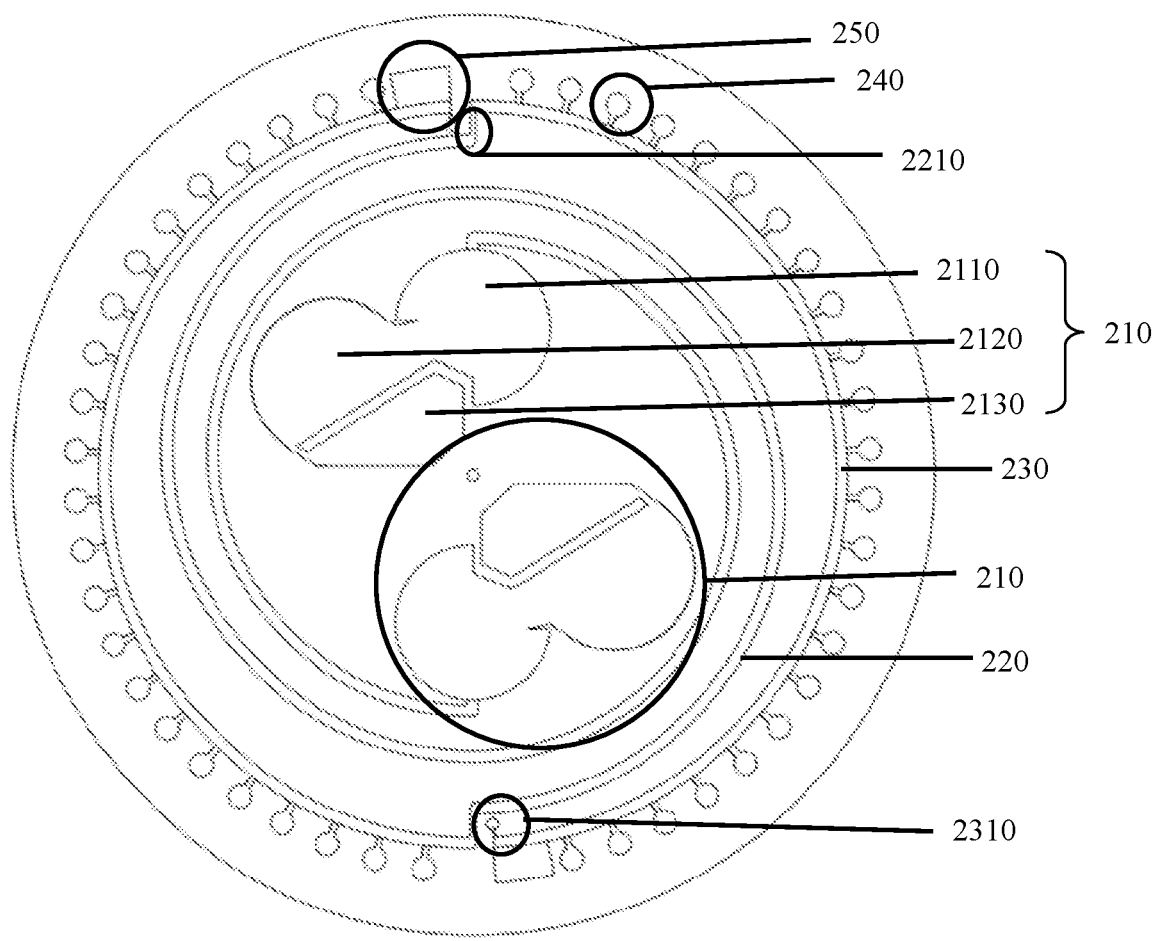
FIG. 4 shows a schematic diagram of the microfluidic module of another preferred embodiment of the invention.
Figure 5:
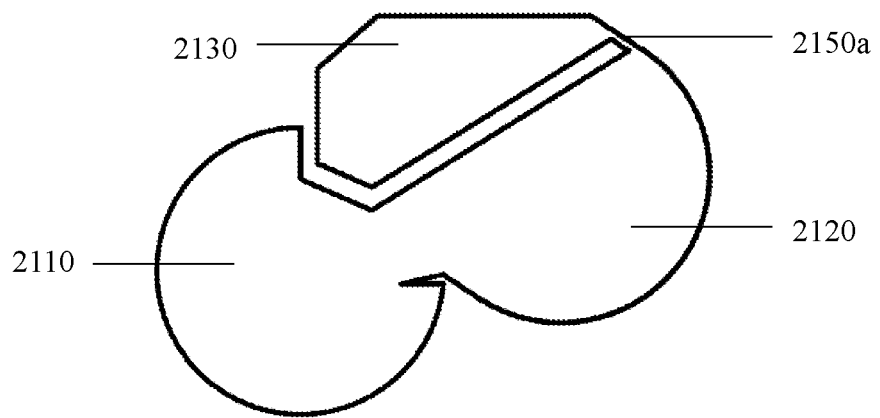
FIG. 5 illustrates a schematic diagram of the injection chamber module of another preferred embodiment of the present invention.
Figure 6:
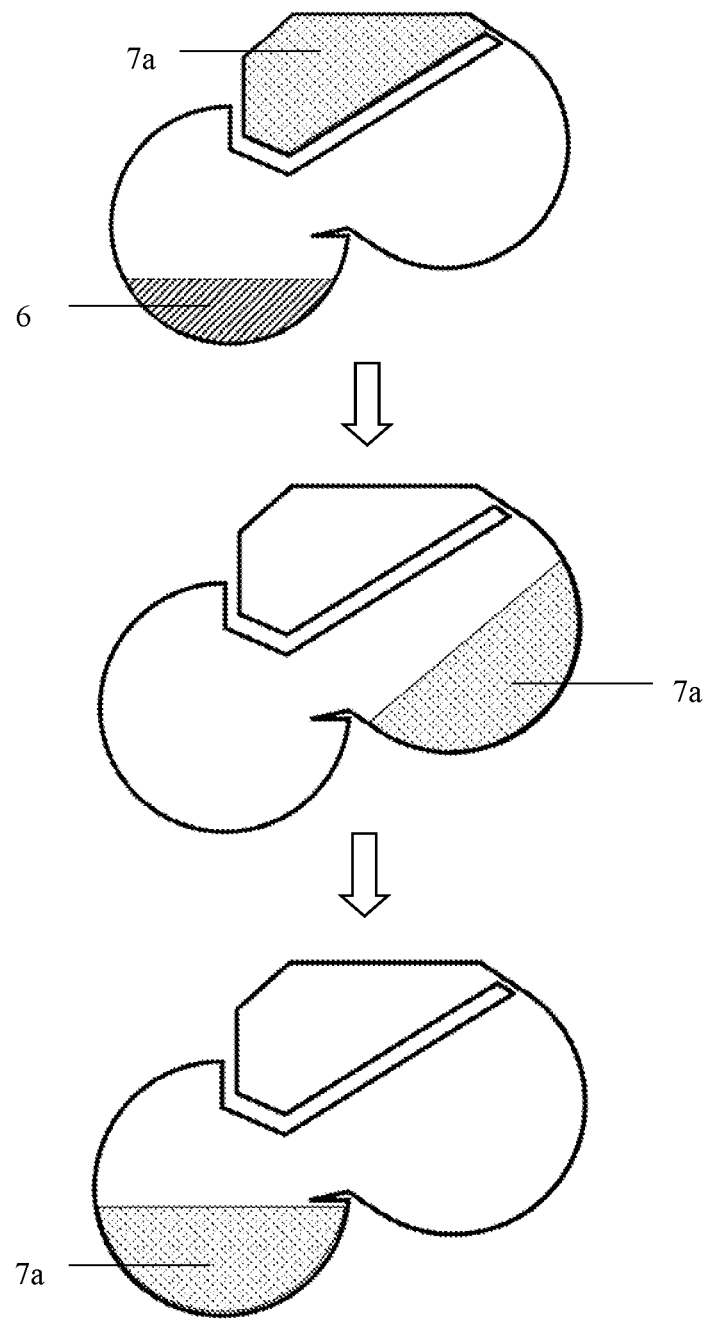
FIG. 6 illustrates a flow diagram showing the steps of using the injection chamber module of another preferred embodiment of the present invention.

Please refer to FIG. 4, FIG. 5 and FIG. 6, the present invention further provides another preferred embodiment of the centrifugal-driven microfluidic platform 1, and the injection chamber module 210 further includes a transient pause chamber 2110, a decanting chamber 2120 and a second eluent chamber 2130. The second eluent chamber 2130 is connected to the decanting chamber 2120 through a first valve 2150a. In this embodiment, first, sample 6 and eluent 7a are injected into the transient pause chamber 2110 and the second eluent chamber 2130, respectively. After the motor starts to rotate, the sample enters the separation column 220 from the transient pause chamber 2110; increasing the rotational speed causes the eluent 7a to enter the decanting chamber 2120 from the second eluent chamber 2130 through the capillary force of the first valve 2150a; after the sample completely enters the separation column 220, quickly decreasing the motor rotational speed causes the eluent 7a to be poured from the decanting chamber 2120 to the transient pause chamber 2110, and then increasing the rotational speed causes the eluent 7a to enter the separation column 220. After the sample 6 and the eluent 7a are separated in the separation column 220, increasing the rotational speed so that the sample 6 and the eluent 7a pass through the first connection channel 2210, enter the dispensing channel 230 and then sequentially enter the plurality of collection chambers 240. Further, please refer to FIG. 2, the dispensing channel 230 is further provided with at least one vent 2310, so that after the separated sample 6 or eluent 7a enters the dispensing channel 230, it would not stay in the dispensing channel 230 and smoothly circulate in it.

Figure 7:
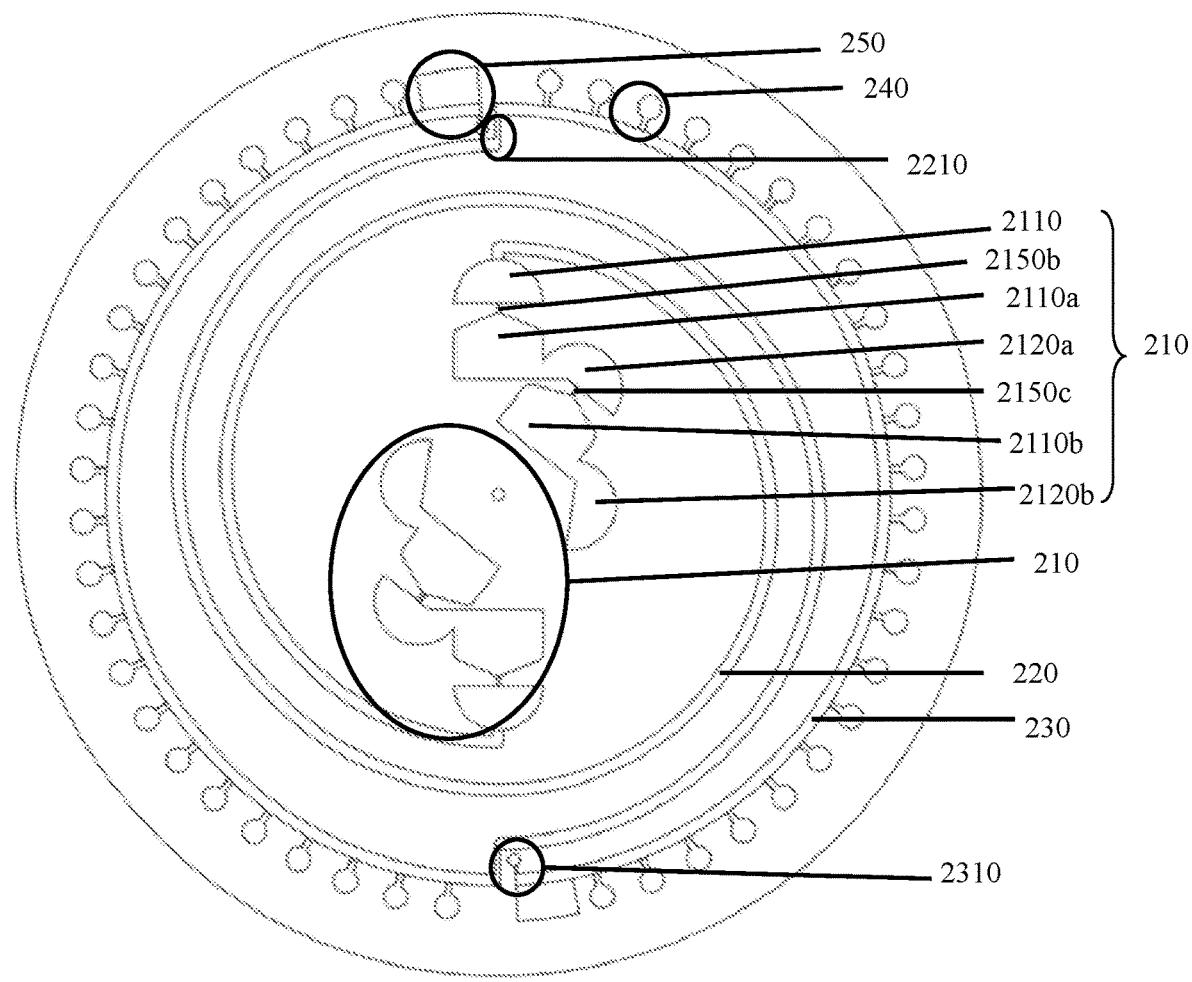
FIG. 7 shows a schematic diagram of the microfluidic module of another preferred embodiment of the invention.
Figure 8:
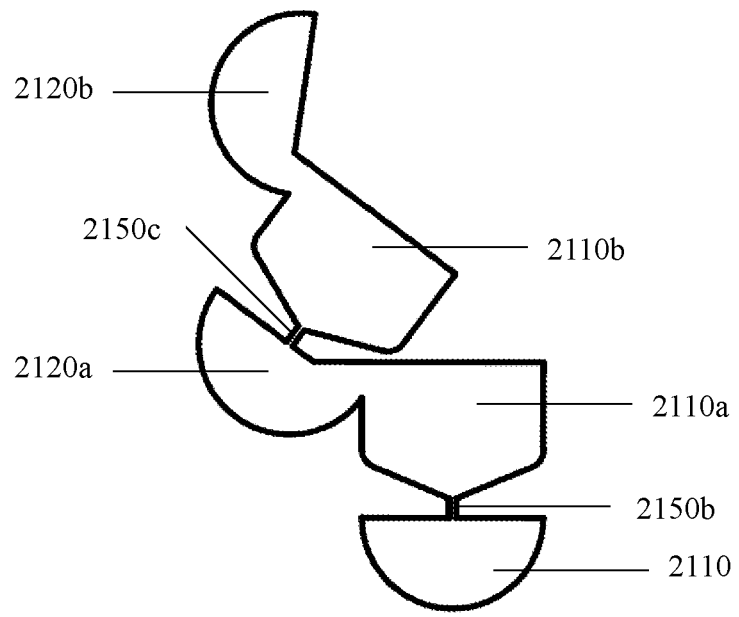
FIG. 8 illustrates a schematic diagram of the injection chamber module of another preferred embodiment of the invention.
Figure 9:
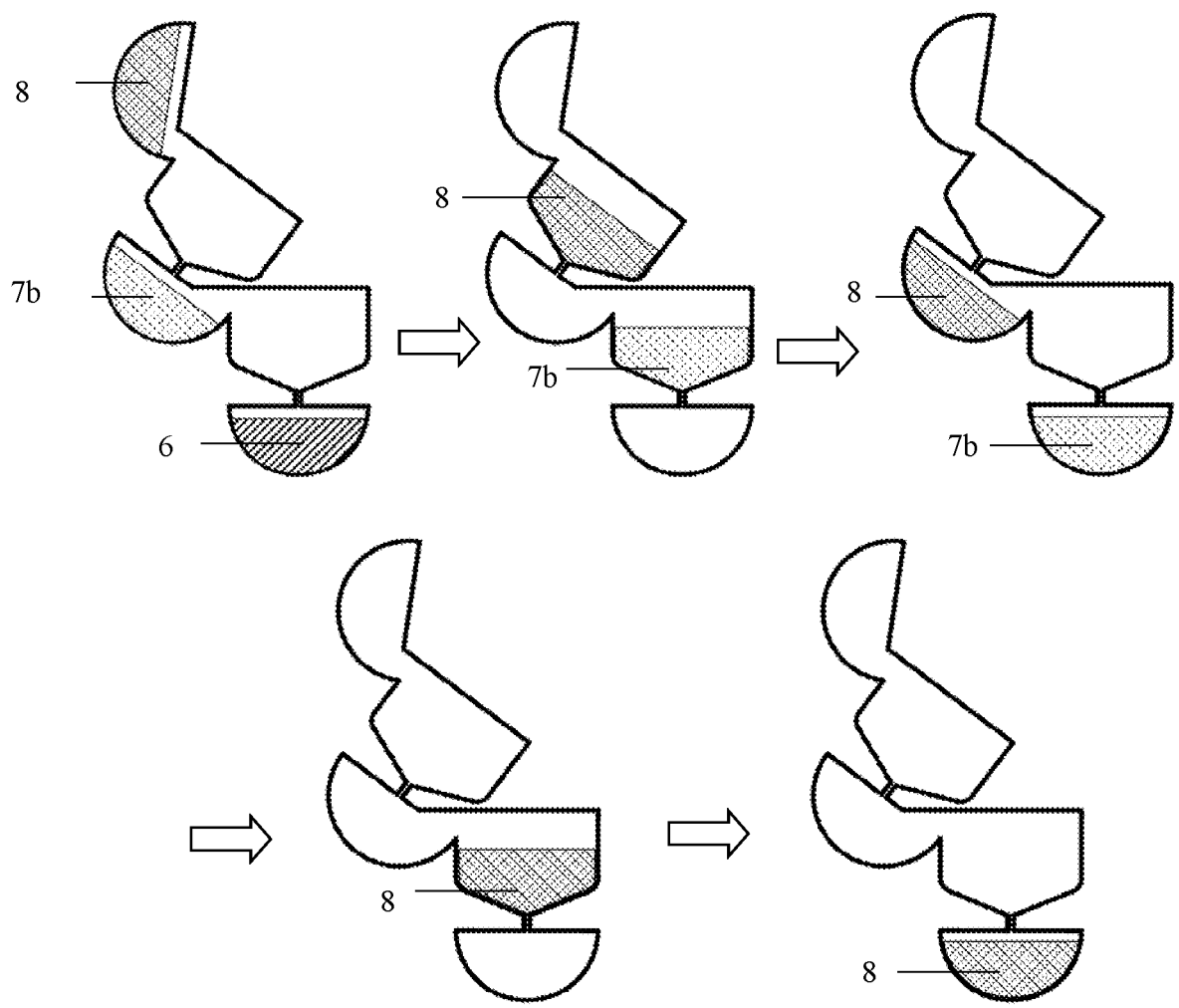
FIG. 9 illustrates a flow diagram showing the steps of using the injection chamber module of another preferred embodiment of the present invention.

Please refer to FIG. 7, FIG. 8 and FIG. 9, the present invention provides another embodiment of the centrifugal-driven microfluidic platform 1. In this embodiment, two types of eluents are used. Corresponding to the two eluents, a first decanting chamber 2120a and a second decanting chamber 2120b are further provided, and the two decanting chambers are respectively connected to a first transient pause chamber 2110a and a second transient pause chamber 2110b. The number of decanting chambers and the number of transient pause chambers can be adjusted accordingly according to the type of eluent used. In this embodiment, only the example of two types of eluents will be demonstrated. The detailed steps will be explained in the following.

Figure 10:
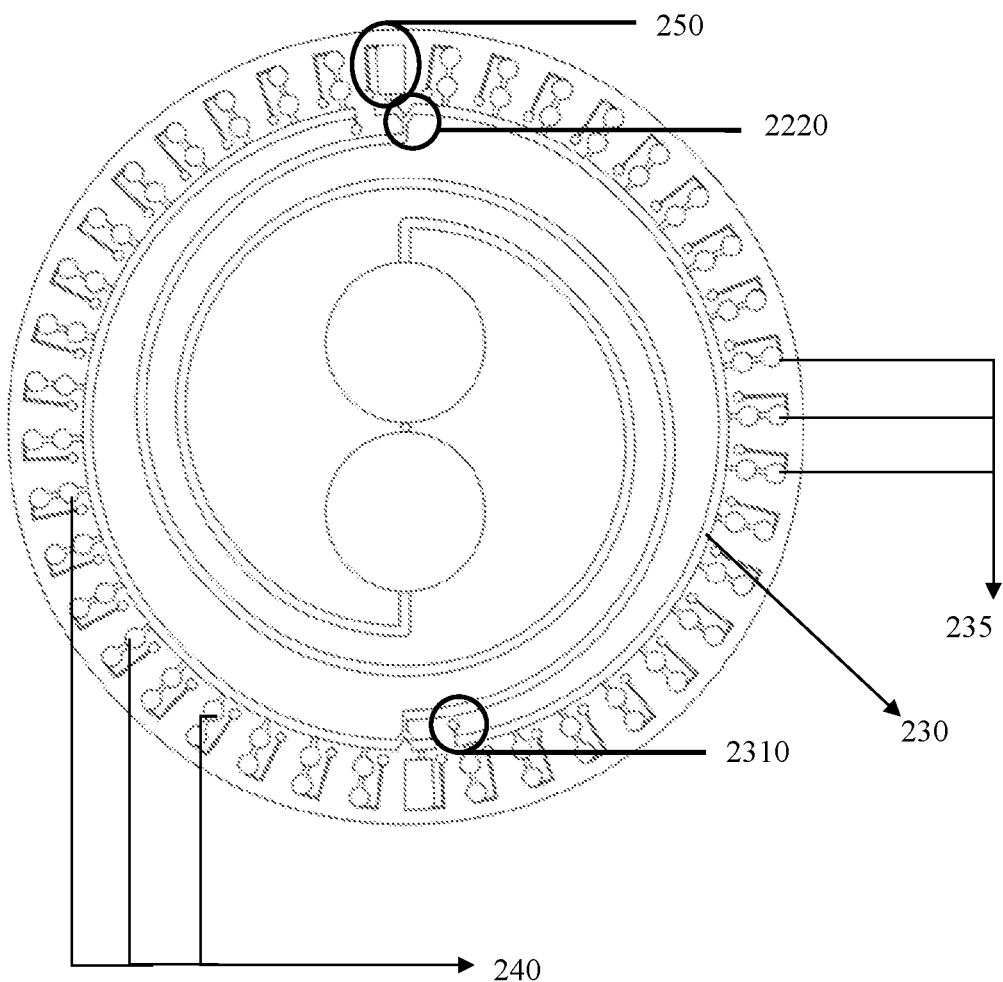
FIG. 10 shows a schematic diagram of the microfluidic module of another preferred embodiment of the invention.
Figure 11:
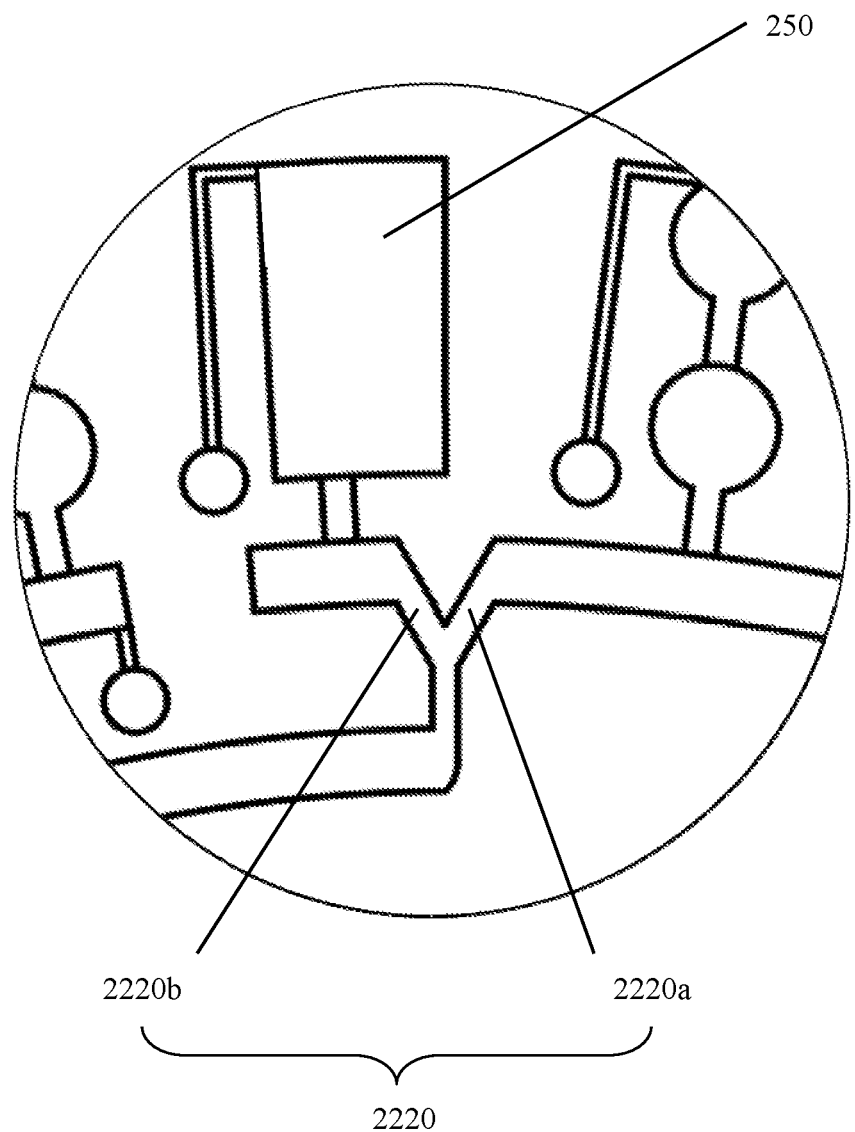
FIG. 11 shows a schematic diagram of the second connection channel of another preferred embodiment of the invention.
Figure 12:
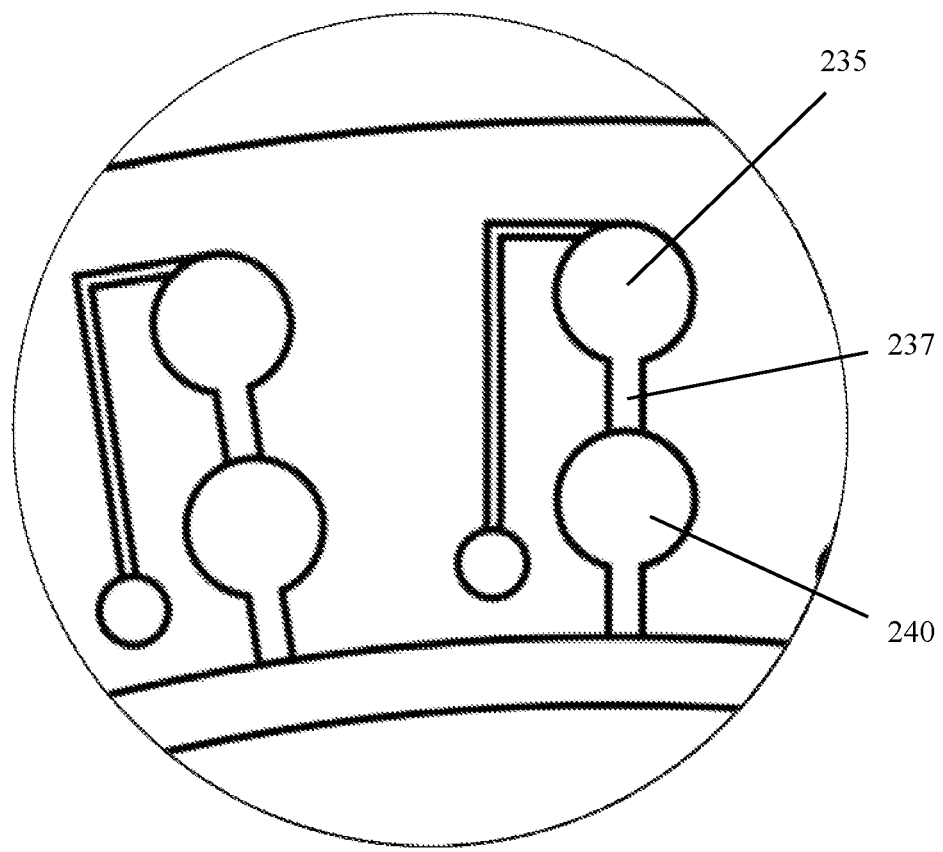
FIG. 12 shows a schematic diagram of the collection chamber, the fourth valve and the extraction chamber of another preferred embodiment of the invention.

Please refer to FIG. 10, FIG. 11 and FIG. 12, the present invention further provides another embodiment of the centrifugal-driven microfluidic platform 1. The connection channel module is a second connection channel 2220, which is two-branched channel and connects the separation column 220 with the dispensing channel 230. The two-branched second connection channel 2220 consists of first flow path 2220a and second flow path 2220b. The first flow path 2220a directs the liquid to the dispensing channel 230 connected to a plurality of collection chambers 240; the second flow path 2220b directs the liquid to the dispensing channel 230 connected to a waste chamber 250. Additionally, an extraction chamber 235 is further disposed on the plurality of collection chambers 240, which is connected with a fourth valve 237. The fourth valve 237 together with the extraction chamber 235 function as a pneumatic valve to facilitate the sequential filling and distribution of the liquid in the plurality of collection chambers 240. In this embodiment, once a plurality of collection chambers 240 have been filled, the pressure of the pneumatic valve which is an integrated structure formed by the fourth valve 237 and the extraction chamber 235 together can be overcome by simultaneously changing the direction and increasing the rotational speed, which makes the sample from the plurality of collection chambers 240 flow into the extraction chambers 235. While the speed is increasing and reversing, the eluent remaining in the separation column 220 will flow into the second flow path 2220b and then into the waste chamber 250. Furthermore, since the plurality of collection chambers 240 are connected to the dispensing channel 230, the design of the pneumatic valve consisting of the fourth valve 237 and the extraction chamber 235 can make the separated sample reverse and increase the speed at the same time, breaking through the pneumatic valve co-constructed with the fourth valve 237 and the extraction chamber 235. In this way, the air originally stored in the extraction chamber 235 and the liquid in the plurality of collection chambers 240 produce a gas-liquid replacement effect. The water film that originally existed between the collection chamber 240 and the dispensing channel 230 cannot further affect the sample that has been allocated to the extraction chamber 235, which completes the separation after the sample purification.

Finally, the detection module 5 of this embodiment utilizes optical detection analysis, nuclear magnetic resonance spectroscopy analysis, thin layer chromatography analysis, gas chromatography analysis and it is not limited to the above. Further, the detection module 5 may be a spectrophotometer, a nuclear magnetic resonance instrument, a thin-layer chromatography plate, and a gas chromatograph, which are not limited within the above. The test result is obtained based on the data acquired.

In a preferred embodiment of the present invention, a method using the above centrifugal-driven microfluidic platform 1 is further provided. Please refer to FIG. 14, the steps include: (a1) Inject particles into the injection chamber module 210 and then pack the separation column 220 with the particles by the driving module 3; (a2) Inject sample into the injection chamber module 210 and then pump the sample into the separation column 220 by the centrifugal force driven by the driving module 3; (a3) Inject eluent into the injection chamber module 210 and then pump the eluent into the separation column 220 by the centrifugal force driven by the driving module 3; (a4) Perform a purification and separation progress, the driving module 3 control the rotational speed to pump the sample and the eluent flowing through the connection channel module, entering the dispensing channel 230, and then filling the plurality of collection chambers 240 in turn; and (a5) Analyze the sample distributed among the plurality of collection chambers 240 by using detection module 5 to acquire a test result.

In this embodiment, the separation column 220 is a spiral structure (spiral shaped), and the dispensing channel 230 is a spiral or arc structure (spiral or arc shaped). The spiral structure is a structure composed of arc circles drawn from inside to outside using a fixed point as the center of the circle (refer to microfluidic disk 20 in this embodiment) gradually increasing the radius of the arc circles. The spiral structure is used to help the centrifugal action, and the centrifugal driving force is used to carry out the purification and separation.

In step (a) of this embodiment, please refer to FIG. 14 and FIG. 2, inject a fixed mass of particles into the injection chamber module 210, and then install the microfluidic module 2 onto the driving module 3, and use the program written in the operation module 4 for oscillation to drive the driving module 3 to control the rotational speed, steering, rotation mode, oscillation frequency, etc. of the microfluidic disk 20. In the embodiment of FIG. 2, silica gel can be used as the material of particles, and it is not limited thereto. In other embodiments, different kinds of material of particles or different kinds of separation columns 220 could be used according to different methods of column chromatography. For example, the separation mechanism of different column chromatography methods may be grouped into adsorption chromatography analysis, partition chromatography analysis, ion exchange chromatography analysis, gel chromatography analysis, affinity chromatography analysis and other categories.

During the oscillation, the particles will be filled into the separation column 220 of the microfluidic disk 20. Similarly, in the embodiment of FIG. 2, the driving module 3 used is a motor, and during the motor vibration the particles are filled.

In step (a2) of this embodiment, please refer to FIG. 2 and FIG. 14, after the separation column 220 is filled, a fixed quantity of sample is injected into the injection chamber module 210 of the microfluidic disk 20, and then the microfluidic disk 20 is placed on the driving module 3. Then, the driving module 3 is driven by the operation module 4 to rotate the microfluidic disk 20, and the sample is loaded into the separation column 220 by generating a centrifugal driving force in the microfluidic disk 20.

In step (a3) of this embodiment, please refer to FIG. 2 and FIG. 14, after the samples are filled into the separation column 220, the fixed quantity of eluent is injected into the injection chamber module 210, and then the microfluidic disk 20 is placed on the driving module 3. Then, the driving module 3 is driven by the operation module 4, the microfluidic disk 20 is rotated, and the eluent in the microfluidic disk 20 is loaded into the separation column 220 by the centrifugal driving force generated. In one of the embodiments, due to different separation processes, eluents with different proportions of components are used in order to meet the needs of each stage of the purification process. In this case, driving module 3 is required for speed control and the design of microfluidic disk 20 is also needed to make various liquids achieve the functions of automatic distribution and sequential release by inertial force.

In step (a4) of this embodiment, please refer to FIG. 2 and FIG. 14, the purification and separation progress is to start the separation of the sample once the eluent enters the separation column 220, and it is required to flow through the dispensing channel 230 during the separation. The separated liquid flows to the collection chamber 240 of the outer radius in sequence, and automatically fills the collection chambers 240 one by one. During the whole process, the operation module 4 is also used to drive the driving module 3, and the driving module 3 controls the rotation and rotational speed of the microfluidic disk 20.

During the purification and separation process of step (a4) of this embodiment, please refer to FIG. 2 and FIG. 14, the centrifugal force of the driving module 3 is used to make the sample and the eluent flow in the flow channel to generate hydraulic pressure and have a driving force. The separation column 220 and the dispensing channel 230 are connected through a first connection channel 2210. When the flow of the sample, the eluent, or the combination thereof in the injection chamber module 210 is close to the bottom of the separation column 220, that is, the volume of the sample, the eluent, or a combination thereof is just filled to the bottom of the separation column 220, the flow is automatically stopped due to the reduced driving force. At this time, the driving module 3 is required to force the sample and the eluent through the first connection channel 2210, flowing into the dispensing channel 230.

In step (a5) of this embodiment, please refer to FIG. 1 and FIG. 2, after the purified sample is completely filled in the collection chamber 240, the remaining eluent, the sample or the combination thereof would flow into the waste chamber 250 for temporary storage by steering control of the driving module 3, and then the detection module 5 can be used for analysis to generate test results. In this embodiment, the detection technology may be optical detection analysis, nuclear magnetic resonance spectroscopy analysis, thin-layer chromatography analysis, and gas chromatography analysis, which is not limited to the above. Further, the detection module 5 may be a spectrophotometer, a nuclear magnetic resonance instrument, a thin-layer chromatography plate, and a gas chromatograph, which are not within the above limits, and the test result is obtained based on the data. In one embodiment, when using spectrophotometry, the detection site of the spectrophotometer is accordingly adjusted to the corresponding site of the collection chamber 240 by the driving module 3 through the connection to the detection module 5 and the microfluidic module 2 respectively, which is used to measure the absorbance value of each collection chamber 240. The detection result is used to find the target isolate or the composition analysis of the unknown sample. Other detection techniques can be dealt with accordingly to obtain their corresponding test results.

Figure 17:
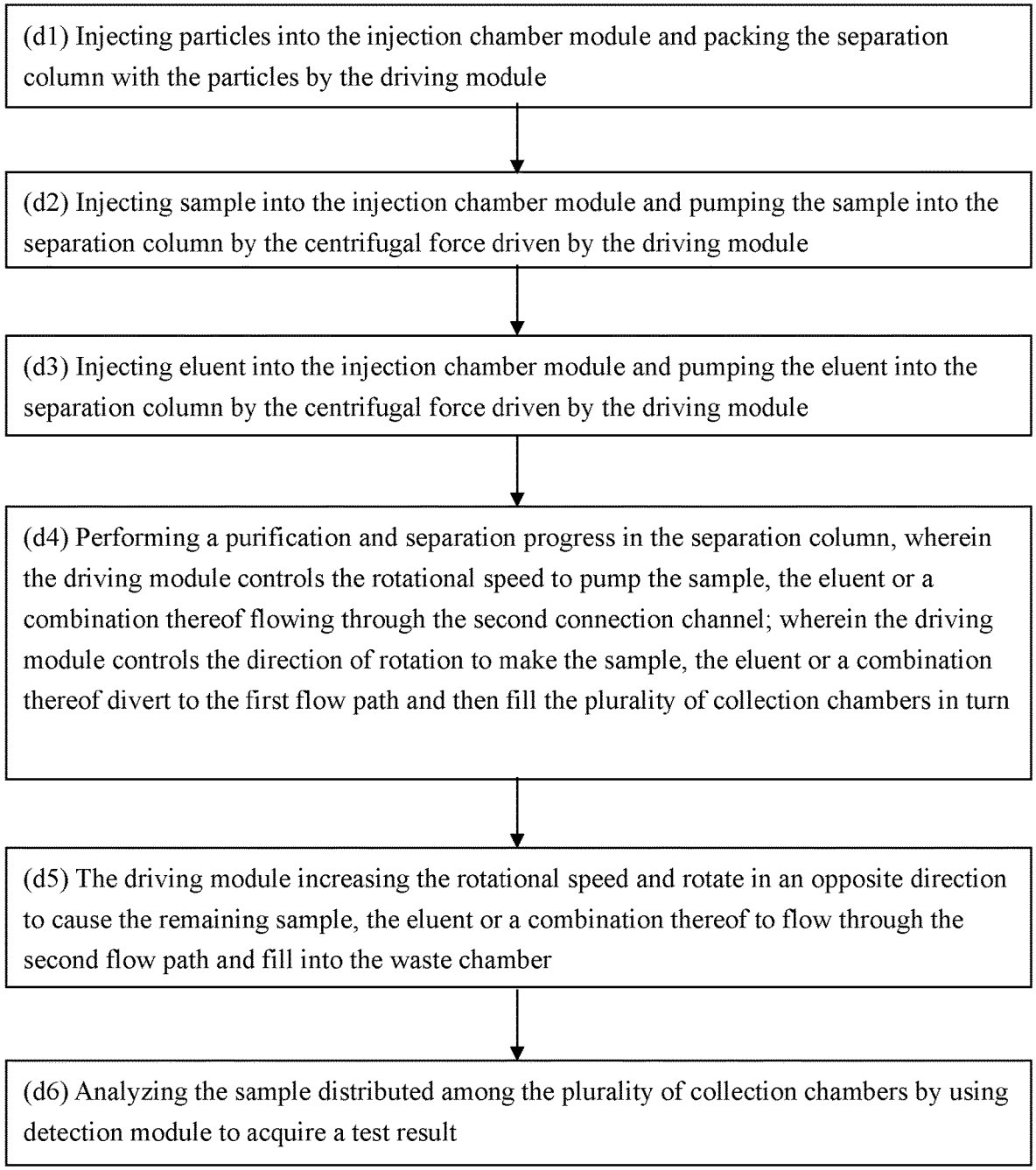
FIG. 17 demonstrates a flow chart showing the steps of using the centrifugal-driven microfluidic platform of another preferred embodiment of the present invention.

The present invention provides another embodiment of the centrifugal-driven microfluidic platform 1, please refer to FIG. 10, FIG. 11 and FIG. 17, when the connection channel module is a second connection channel (the second connection channel is a two-branched channel), the steps include: (d1) Inject particles into the injection chamber module 210 and then pack the separation column 220 with the particles by the driving module; (d2) Inject sample into the injection chamber module 210 and then pump the sample into the separation column 220 by the centrifugal force driven by the driving module 3; (d3) Inject eluent into the injection chamber module 210 and then pump the eluent into the separation column 220 by the centrifugal force driven by the driving module 3; (d4) Perform a purification and separation progress in the separation column 220, which comprising the steps: the driving module 3 controls the rotational speed to pump the sample, the eluent or a combination thereof flowing through the second connection channel 2220; the driving module 3 control the direction of rotation to make the sample, the eluent or a combination thereof divert to the first flow path and then fill the plurality of collection chambers 240 in turn; (d5) The driving module 3 increase the rotational speed and rotate in an opposite direction to cause the remaining sample, the eluent or a combination thereof to flow through the second flow path and fill into the waste chamber 250; and (d6) Analyze the sample distributed among the plurality of collection chambers 240 by using detection module 5 to acquire a test result.

Please refer to FIG. 10 and FIG. 11, in this embodiment, the connection channel module is a second connection channel 2220 which is a two-branched channel, connecting the separation column 220 with the dispensing channel 230. In the step (d4) different from the previous embodiment, the sample, the eluent, or a combination thereof flow through the second connection channel 2220 by the driving module 3, and then the direction of the outflow from the separation column 220 is guided by the driving module 3 to the first flow path 2220a or the second flow path 2220b within the two-branched second connection channel 2220. In step (d4), the speed is controlled by the driving module 3 to guide the liquid into the first flow path 2220a and through the dispensing channel 230 connected to a plurality of collection chambers 240, and eventually resulting in filling the plurality of collection chambers 240 one by one; In (d5), using the driving module 3 to increase the speed and reverse at the same time, the eluent remaining in the separation column 220 will flow into the second flow path 2220b and direct the liquid to the waste chamber 250 connected to the dispensing channel 230 and fill the waste chamber 250. Finally, as in the previous embodiment, the process proceeds to step (d6) to obtain an analysis of the test results.

Figure 18:
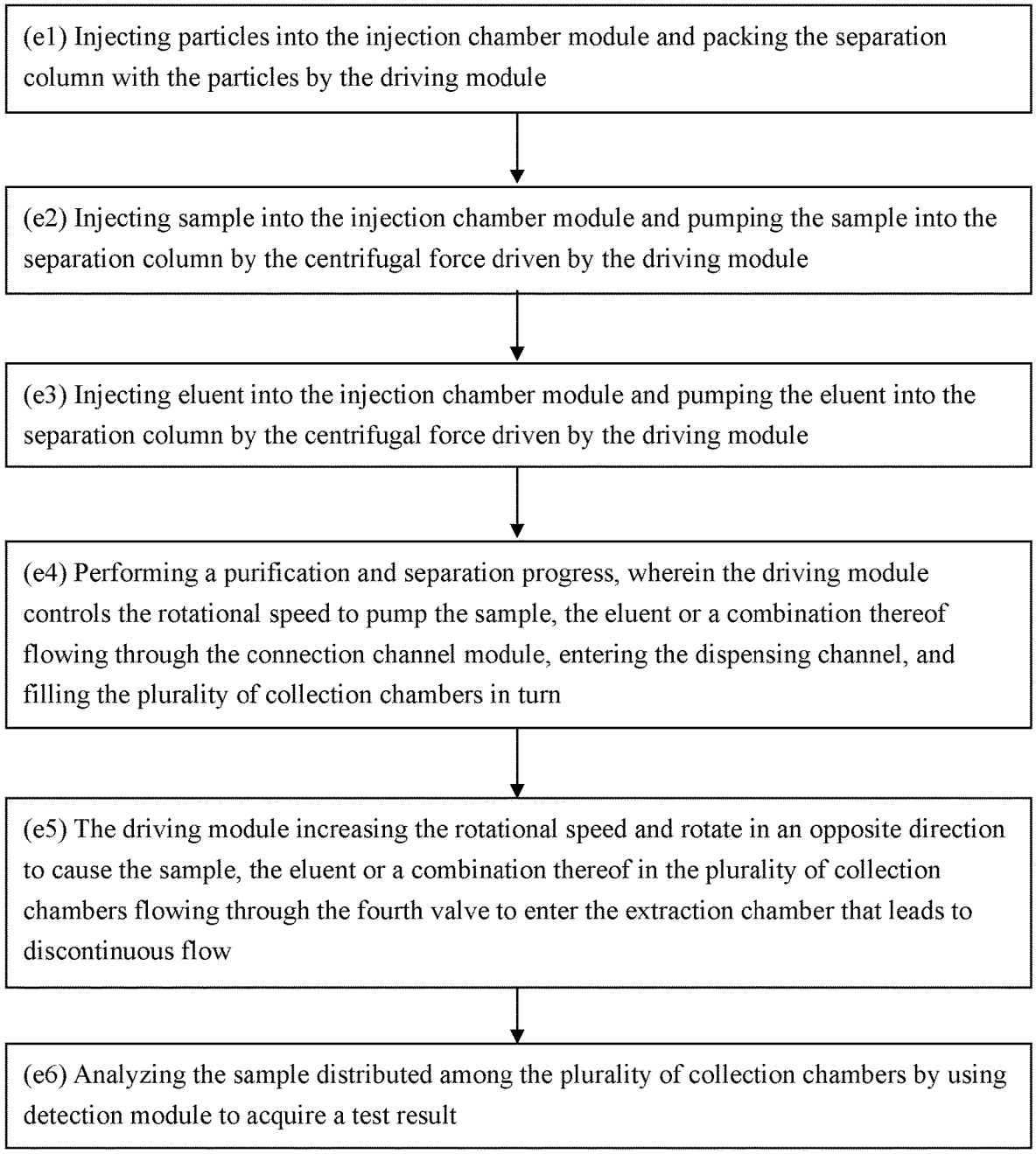
FIG. 18 demonstrates a flow chart showing the steps of using the centrifugal-driven microfluidic platform of still another preferred embodiment of the present invention.

The present invention further provides another method of using the centrifugal-driven microfluidic platform 1, please refer to FIG. 10, FIG. 12 and FIG. 18. When each of the plurality of collection chambers 240 is further provided with an extraction chamber 235 and the extraction chamber 235 is connected to each of the plurality of collection chambers 240 by a fourth valve 237, the steps include: (e1) Inject particles into the injection chamber module 210 and then pack the separation column 220 with the particles by the driving module 3; (e2) Inject sample into the injection chamber module 210 and then pump the sample into the separation column 220 by the centrifugal force driven by the driving module 3; (e3) Inject eluent into the injection chamber module 210 and then pump the eluent into the separation column 220 by the centrifugal force driven by the driving module 3; (e4) Perform a purification and separation progress, the driving module 3 control the rotational speed to pump the sample, the eluent or a combination thereof flowing through the connection channel module, entering the dispensing channel 230, and then filling the plurality of collection chambers 240 in turn; and (e5) The driving module 3 increase the rotational speed and rotate in an opposite direction to cause the sample, the eluent or a combination thereof in the plurality of collection chambers 240 flow through the fourth valve 237 to enter the extraction chamber 235 that leads to discontinuous flow; (e6) Analyze the sample distributed among the plurality of collection chambers 240 by using detection module 5 to acquire a test result.

In this embodiment, after the purification and separation progress in step (e4), the excess eluent, the sample, or a combination thereof flows into the waste chamber 250. Next, in the step (e5) different from the previous embodiment, please refer to FIG. 10 and FIG. 12, the plurality of collection chambers 240 are each further provided with an extraction chamber 235, which is connected by a fourth valve 237. The fourth valve 237 and the extraction chamber 235 are integrally formed as a pneumatic valve, so that the liquid in the plurality of collection chambers 240 could fill the pneumatic valve and distribute accordingly in sequence. In this embodiment, by changing the direction and increasing the speed simultaneously, the separated samples in the plurality of collection chambers 240 would be pumped through the pressure inflow of the pneumatic valve formed by the fourth valve 237 and the extraction chamber 235 together and ends in flowing into the extraction chamber 235. The above-mentioned leads to the effect of blocking the flow and not returning into the dispensing channel 230, reducing the risk of mixing with the solution in other collection chambers 240. While the speed is increasing and reversing, the eluent remaining in the separation column 220 will flow into the second flow path 2220b and then into the waste chamber 250. Further, please refer to FIG. 12, because a plurality of collection chambers 240 are connected to the dispensing channel 230, and the fourth valve 237 and extraction chamber 235 are configured as a pneumatic valve design, the separated sample would break through the pneumatic valve constructed by fourth valve 237 and extraction chamber 235 when changing the direction and increasing the speed simultaneously. In this way, the air originally stored in the extraction chamber 235 and the liquid in the plurality of collection chambers 240 produce a gas-liquid replacement effect. The water film that originally existed between the collection chamber 240 and the dispensing channel 230 cannot further affect the sample that has been allocated to the extraction chamber 235, which completes the separation and purification progress of the sample. If the purified sample is required for testing, the separated liquid can be directly extracted from the extraction chamber 235.

The present invention further provides another embodiment of the centrifugal-driven microfluidic platform 1, please refer to FIG. 4, FIG. 5, FIG. 6 and FIG. 15, each of the injection chamber module 210 further comprises a transient pause chamber 2110, a decanting chamber 2120 and a second eluent chamber 2130, and the second eluent chamber 2130 connects with the decanting chamber 2120 by a first valve 2150a. All steps include: (b1) Inject particles into the injection chamber module 210 and then pack the separation column 220 with the particles by the driving module 3; (b2) Inject sample 6 and at least one eluent 7a into the transient pause chamber 2110 and the at least one second eluent chamber 2130 respectively, and then pump the sample 6 into the separation column 220 by the centrifugal force driven by the driving module, and simultaneously the at least one eluent 7a is trapped by the first valve 2150a, staying in the at least one second eluent chamber 2130; (b3) Increase the rotational speed by the driving module 3 so that the at least one eluent 7a overcomes the first valve 2150a and enters the at least one decanting chamber 2120; then, the rotational speed is rapidly lowered so that the at least one eluent 7a enters the transient pause chamber 2110 from the at least one decanting chamber 2120; finally, increase the rotational speed to make the eluent 7a enter the separation column 220 again; (b4) Perform a purification and separation progress, the driving module 3 control the rotational speed to pump the sample 6 and the eluent 7a flowing through the connection channel module, entering the dispensing channel 230, and then filling the plurality of collection chambers 240 in turn; and (b5) Analyze the sample 6 distributed among the plurality of collection chambers 240 by using the detection module 5 to acquire a test result. The method using the centrifugal-driven microfluidic platform 1 further comprises a first automatic step which consists of step (b2) and step (b3).

Furthermore, the first automatic step shown in FIG. 15 is demonstrated in the present embodiment in FIG. 6. First, in step (b2), sample 6 is injected into the transient pause chamber 2110, and eluent 7a is injected into the second eluent chamber 2130. After the driving module 3 starts to rotate, sample 6 enters the separation column 220 from the transient pause chamber 2110, and at the same time, the eluent 7a stays in the second eluent chamber 2130 because of the capillary pressure of the first valve 2150a. Therefore, in step (b3), increasing the rotational speed causes the eluent 7a to overcome the capillary pressure of the first valve 2150a and enter the decanting chamber 2120. After the sample 6 completely enters the separation column 220, the motor speed is quickly reduced, so that the eluent 7a in the decanting chamber 2120 is poured into the transient pause chamber 2110 under the inertial force. Finally, increase the rotational speed to make eluent 7a enter the separation column 220. After the sample 6 and the eluent 7a are separated in the separation column 220, proceed to step (b4), please refer to FIG. 4. Under the control of speed, the separated sample 6 and the eluent 7a pass through the first connection channel 2210 and then enter the dispensing channel 230, sequentially filling in the plurality of collection chambers 240. After the purification and separation progress in step (b4), the excess eluent 7a, the sample 6 or a combination thereof flows into the waste chamber 250. Finally, step (b5) is carried out, as in the previously mentioned step (a5).

Additionally to the above, the present invention further provides another embodiment of the centrifugal-driven microfluidic platform 1, please refer to FIG. 7, FIG. 8, FIG. 9 and FIG. 16. In the case that there are two types of eluent, the injection chamber module 210 further includes a transient pause chamber 2110, a first transient pause chamber 2110a, a first decanting chamber 2120a, a second transient pause chamber 2110b, and a second decanting chamber 2120b. The steps of the method using the centrifugal-driven microfluidic platform 1 include: (c1) Inject particles into the injection chamber module 210 and then pack the separation column 220 with the particles by the driving module 3; (c2) Inject sample 6, the first eluent 7b and the second eluent 8 into the transient pause chamber 2110, the first decanting chamber 2120a and the second decanting chamber 2120b respectively, and then pump the sample 6 into the separation column 220 by the driving module 3, and rapidly decrease the rotational speed so that the first eluent 7b enters the first transient pause chamber 2110a and the second eluent 8 enters the second transient pause chamber 2110b; (c3) Increase the rotational speed by the driving module 3 so that the first eluent 7b overcomes the second valve 2150b to enter the transient pause chamber 2110 and the second eluent 8 overcomes the third valve 2150c to enter the first decanting chamber 2110a; (c4) Reduce the rotational speed or change the direction of rotation by the driving module 3 so that the first eluent 7b enters the separation column 220 and the second eluent 8 enters the first transient pause chamber 2110a; (c5) Increase the rotational speed by the driving module 3 to make the second eluent 8 overcome the second valve 2150b and enter the transient pause chamber 2110, and then enter the separation column 220; (c6) Perform a purification and separation progress, the driving module 3 control the rotational speed to pump the sample 6, the first eluent 7b and the second eluent 8 flowing through the connection channel module, entering the dispensing channel 230, and then filling the plurality of collection chambers 240 in turn; and (c7) Analyze the sample 6 distributed among the plurality of collection chambers 240 by using the detection module 5 to acquire a test result. The method using the centrifugal-driven microfluidic platform 1 further comprises a second automatic step which consists of step (c2), step (c3), step (c4) and step (c5).

In this embodiment, please refer to FIGS. 8 and 9, the second automatic step includes: in step (c2), after adding the sample 6, first eluent 7b and second eluent 8 into the transient pause chamber 2110, the first decanting chamber 2120a and the second decanting chamber 2120b respectively, the rotational speed of the driving module 3 is rapidly reduced, or optimally, it is suddenly reduced to zero, so that under the inertial force, the sample 6 fills the separation column 220 first, and the first eluent 7b enters the first transient pause chamber 2110a and simultaneously the second eluent 8 enters the second transient pause chamber 2110b. Eluents are all trapped due to the disposition of the blocking valves; in step (c3), the speed is increased by the driving module 3 to make the first eluent 7b overcome the capillary pressure of the second valve 2150b to enter the transient pause chamber 2110 from the first transient pause chamber 2110a, and the second eluent 8 overcomes the capillary pressure of the third valve 2150c to enter the first decanting chamber 2120a from the second transient pause chamber 2110b; in step (c4), the driving module 3 reduces the rotational speed or changes the rotation direction so that the first eluent 7b enters the separation column 220, and simultaneously the second eluent 8 enters the first transient pause chamber 2110a; and in the last step (c5), increase the rotational speed through the driving module 3 to make the second eluent 8 overcome the capillary pressure of the second valve 2150b and enter the transient pause chamber 2110 from the first transient pause chamber 2110a. After performing the purification and separation progress in step (c6) in the same manner as the step (b4) of the foregoing embodiment, the excess first eluent 7b, the second eluent 8, the sample 6, or a combination thereof flows into the waste chamber 250, and continue to carry out the test analysis in step (c7) to get the test results.

The method and examples of the present invention using the centrifugal-driven microfluidic platform 1 as described above are not limited to the above embodiments, and the structure or number of the injection chamber modules 210 can be adjusted according to the requirements of usage. For example, when N types of eluents are used, the injection chamber module 210 further includes N decanting chambers and N+1 transient pause chambers. The steps of the method can be repeated according to the steps of the foregoing embodiments to achieve multiple-stage liquid release.

Overall, in the embodiments of the method of the centrifugal-driven microfluidic platform 1 shown in FIG. 14 to FIG. 18 above, during step (a1), step (b1), step (c1), step (d1) and step (e1), after adding the particles to the separation column 220 and before the sample injection (that is, before step (a2), step (b2), step (c2), step (d2) and step (e2)), it can be adjusted whether to inject the eluent into the separation column 220 to wet the particles before injecting the sample according to the characteristics of the sample, such as the polarity, so as to improve the separation efficiency of column chromatography. Furthermore, in some of the possible embodiments, it is feasible to inject the sample into the packed column with the particles in a wet state which is done by an eluent injected in advance to perform column chromatography separation; of course, after the particles are packed into the separation column 220, it is an alternative method to perform column chromatography separation by injecting the sample directly without eluent injection in advance to make the particles dry. Regardless of whether the particles are in a dry state, a wet state, or other states of particles adjusted according to the characteristics or properties of the sample, it should all be included in the scope of the present invention.

In summary, with the centrifugal-driven microfluidic platform 1 of this embodiment and its method of use, the sample purification process can be completed within 1 hour. Additionally, the required volume of sample can be less than 50 microliters (μL), and the purified compound can be easily extracted. Besides, in this embodiment, the characteristics of the small particles size, low particles porosity, long separation column and low disc rotational speed will prolong the analysis time; however, it improves the separation results.

Therefore, compared to the existing column chromatography method, the centrifugal-driven microfluidic platform 1 and its method of use described in the embodiments take advantages of low cost of device, improvement of sample and detection liquid limit, and fast and automated process. The process allows automatically distributing purified isolates without manual collection. Accordingly, the present invention is expected to replace the existing purification and separation experimental method in organic laboratory, become the compound purification and separation platform in the next generation, which permits the detection of items in daily life related to water quality detection or food safety . . . etc.

As is understood by a person skilled in the art, the foregoing preferred than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A centrifugal-driven microfluidic platform, comprising:
a microfluidic module, comprising a microfluidic disk and a microfluidic structure; wherein the microfluidic structure further comprises:
at least one injection chamber module, disposed on the microfluidic disk; wherein each of the at least one injection chamber module further comprises at least one transient pause chamber and at least one decanting chamber and at least one second eluent chamber, and the at least one decanting chamber is connected with the at least one second eluent chamber via a first valve;
at least one separation column, disposed on the microfluidic disk and connected with the injection chamber module;
at least one dispensing channel, disposed on the microfluidic disk and connected with the separation column by a connection channel module;
a plurality of collection chambers, disposed on the microfluidic disk; wherein each of the collection chamber connects with the dispensing channel respectively;
a waste chamber, disposed at the end of the dispensing channel;
a driving module, wherein a microfluidic module is disposed on the driving module;
an operation module, wherein the operation module drives the driving module; and
a detection module, wherein the detection module connects with the microfluidic module and the driving module respectively;
wherein at least one separation column is spiral shaped;
wherein the at least one dispensing channel is spiral structure or arc shaped.

2. The centrifugal-driven microfluidic platform as claimed in claim 1, wherein the end of the separation column is sealed with a blockage module.

3. The centrifugal-driven microfluidic platform as claimed in claim 1, wherein the injection chamber module further comprises a sample chamber and a first eluent chamber.

4. The centrifugal-driven microfluidic platform as claimed in claim 1, wherein each of the at least one injection chamber module further comprises:

a transient pause chamber;
a first transient pause chamber, wherein the first transient pause chamber connects with the transient pause chamber via a second valve;
a second transient pause chamber;
a first decanting chamber, wherein the first decanting chamber connects with the second transient pause chamber via a third valve and the other side of the first decanting chamber connects with the first transient pause chamber; and
a second decanting chamber, wherein the second decanting chamber connects with the second transient pause chamber.

5. The centrifugal-driven microfluidic platform as claimed in claim 1, wherein the at least one dispensing channel further comprises at least one vent; the driving module comprises at least one motor; the operation module comprises at least one computer.

6. The centrifugal-driven microfluidic platform as claimed in claim 1, wherein the connection channel module is a first connection channel, and the first connection channel is a single-branched channel.

7. The centrifugal-driven microfluidic platform as claimed in claim 1, wherein the connection channel module is a second connection channel, and the second connection channel is a two-branched channel.

8. The centrifugal-driven microfluidic platform as claimed in claim 1, wherein an extraction chamber is disposed on each of the plurality of collection chambers, and each of the extraction chamber connects with each of the plurality of collection chambers via a fourth valve.

9. The centrifugal-driven microfluidic platform as claimed in claim 1, wherein the detection module comprises a spectrophotometer, a nuclear magnetic resonance, a thin layer chromatography, a gas chromatography or a combination thereof.

10. A method of using the centrifugal-driven microfluidic platform as claimed in claim 1, wherein the method has steps comprise:
(a1) injecting particles into the injection chamber module and packing the separation column with the particles by the driving module;
(a2) injecting sample into the injection chamber module and pumping the sample into the separation column by the centrifugal force driven by the driving module;
(a3) injecting eluent into the injection chamber module and pumping the eluent into the separation column by the centrifugal force driven by the driving module;
(a4) performing a purification and separation progress, wherein the driving module controls the rotational speed to pump the sample and the eluent flowing through the connection channel module, entering the dispensing channel, and filling the plurality of collection chambers in turn; and
(a5) analyzing the sample distributed among the plurality of collection chambers by using detection module to acquire a test result.

11. A method of using the centrifugal-driven microfluidic platform as claimed in claim 1, wherein the method has steps comprising:
(b1) injecting particles into the injection chamber module and pack the separation column with the particles by the driving module;
(b2) injecting sample and at least one eluent into the transient pause chamber and the at least one second eluent chamber respectively, and pumping the sample into the separation column by the centrifugal force driven by the driving module, and simultaneously the at least one eluent is trapped via the first valve, staying in the at least one second eluent chamber;

(b3) increasing the rotational speed by the driving module so that the at least one eluent overcomes the first valve and enters the at least one decanting chamber, and the rotational speed is rapidly lowered so that the at least one eluent enters the transient pause chamber from the at least one decanting chamber; increasing the rotational speed to make the eluent enter the separation column again;

(b4) performing a purification and separation progress, wherein the driving module control the rotational speed to pump the sample and the eluent flowing through the connection channel module, entering the dispensing channel, and then filling the plurality of collection chambers in turn; and (b5) analyzing the sample distributed among the plurality of collection chambers by using the detection module to acquire a test result.

12. A method of using the centrifugal-driven microfluidic platform as claimed in claim 4, wherein the method has steps comprising:

(c1) injecting particles into the injection chamber module and packing the separation column with the particles by the driving module;

(c2) injecting sample, the first eluent and the second eluent into the transient pause chamber, the first decanting chamber and the second decanting chamber respectively, and pumping the sample into the separation column by the driving module, and rapidly decrease the rotational speed so that the first eluent enters the first transient pause chamber and the second eluent enters the second transient pause chamber;

(c3) increasing the rotational speed by the driving module so that the first eluent overcomes the second valve to enter the transient pause chamber and the second eluent overcomes the third valve to enter the first decanting chamber;

(c4) reducing the rotational speed or change the direction of rotation by the driving module so that the first eluent enters the separation column and the second eluent enters the first transient pause chamber;

(c5) increasing the rotational speed by the driving module to make the second eluent overcome the second valve and enter the transient pause chamber, and then enter the separation column;

(c6) performing a purification and separation progress, wherein the driving module controls the rotational speed to pump the sample, the first eluent and the second eluent flowing through the connection channel module, entering the dispensing channel, and then filling the plurality of collection chambers in turn; and (c7) analyzing the sample distributed among the plurality of collection chambers by using the detection module to acquire a test result.

13. A method of using the centrifugal-driven microfluidic platform as claimed in claim 7, wherein the method has steps comprising:

(d1) injecting particles into the injection chamber module and packing the separation column with the particles by the driving module;

(d2) injecting sample into the injection chamber module and pumping the sample into the separation column by the centrifugal force driven by the driving module;

(d3) injecting eluent into the injection chamber module and pumping the eluent into the separation column by the centrifugal force driven by the driving module;

(d4) performing a purification and separation progress in the separation column, wherein the driving module controls the rotational speed to pump the sample, the eluent or a combination thereof flowing through the second connection channel; wherein the driving module controls the direction of rotation to make the sample, the eluent or a combination thereof divert to the first flow path and then fill the plurality of collection chambers in turn;

(d5) increasing, by the driving module, the rotational speed and rotate in an opposite direction to cause the remaining sample, the eluent or a combination thereof to flow through the second flow path and fill into the waste chamber; and (d6) analyzing the sample distributed among the plurality of collection chambers by using detection module to acquire a test result.

14. A method of using the centrifugal-driven microfluidic platform as claimed in claim 8, wherein the method has steps comprising:

(e1) injecting particles into the injection chamber module and packing the separation column with the particles by the driving module;

(e2) injecting sample into the injection chamber module and pumping the sample into the separation column by the centrifugal force driven by the driving module;

(e3) injecting eluent into the injection chamber module and pumping the eluent into the separation column by the centrifugal force driven by the driving module;

(e4) performing a purification and separation progress, wherein the driving module controls the rotational speed to pump the sample, the eluent or a combination thereof flowing through the connection channel module, entering the dispensing channel, and filling the plurality of collection chambers in turn; and (e5) increasing, by the driving module, the rotational speed and rotate in an opposite direction to cause the sample, the eluent and combinations thereof in the plurality of collection chambers flowing through the fourth valve to enter the extraction chamber that leads to discontinuous flow;

(e6) analyzing the sample distributed among the plurality of collection chambers by using detection module to acquire a test result.

15. The method of using the centrifugal-driven microfluidic platform as claimed in claim 10, after the injection of the particles, the particles in the separation column are dry or wet.

16. The method of using the centrifugal-driven microfluidic platform as claimed in claim 11, after the injection of the particles, the particles in the separation column are dry or wet.

17. The method of using the centrifugal-driven microfluidic platform as claimed in claim 12, after the injection of the particles, the particles in the separation column are dry or wet.

18. The method of using the centrifugal-driven microfluidic platform as claimed in claim 13, after the injection of the particles, the particles in the separation column are dry or wet.

19. The method of using the centrifugal-driven microfluidic platform as claimed in claim 14, after the injection of the particles, the particles in the separation column are dry or wet.

* * * * *